United States Patent
Johnson (10) Patent No.: US 10,717,465 B2
(45) Date of Patent: Jul. 21, 2020

(54) STEERABLE KNUCKLE

(71) Applicant: Deere & Company, Moline, IL (US)

(72) Inventor: Bruce Johnson, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 274 days.

(21) Appl. No.: 15/800,207

(22) Filed: Nov. 1, 2017

(65) Prior Publication Data

US 2019/0126979 A1    May 2, 2019

(51) Int. Cl.
*B62D 7/18*     (2006.01)
*B62D 11/20*    (2006.01)
*B62D 55/084*   (2006.01)
*B62D 55/065*   (2006.01)
*B62D 55/04*    (2006.01)

(52) U.S. Cl.
CPC .............. *B62D 7/18* (2013.01); *B62D 11/20* (2013.01); *B62D 55/084* (2013.01); *B62D 55/04* (2013.01); *B62D 55/065* (2013.01)

(58) Field of Classification Search
CPC ........ B62D 7/18; B62D 11/20; B62D 55/084; B62D 55/04; B62D 55/065
USPC ........................................................ 180/9.1
See application file for complete search history.

(56) References Cited

U.S. PATENT DOCUMENTS

| | | | |
|---|---|---|---|
| 3,379,455 A | 4/1968 | Dahlstrom | |
| 6,176,334 B1 | 1/2001 | Lorenzen | |
| 6,401,847 B1 | 6/2002 | Lykken | |
| 6,402,169 B1 | 6/2002 | Schafer et al. | |
| 7,111,697 B2 | 9/2006 | Brazier | |
| 8,083,242 B2 | 12/2011 | Brazier | |
| 8,430,188 B2 | 4/2013 | Hansen | |
| 9,193,383 B2 | 11/2015 | Pare et al. | |
| 9,303,692 B2 * | 4/2016 | Lubben | F16C 33/6681 |
| 9,434,426 B2 | 9/2016 | Nagorcka et al. | |
| 9,505,432 B2 | 11/2016 | Pare et al. | |
| 9,586,635 B2 | 3/2017 | Sewell | |
| 9,663,918 B2 | 5/2017 | Vik et al. | |
| 10,197,152 B2 | 2/2019 | Volkmer et al. | |

(Continued)

OTHER PUBLICATIONS

German Search Report issued in counterpart application No. 102018218716.9 dated Sep. 13, 2019. (12 pages).

(Continued)

*Primary Examiner* — Jacob D Knutson
(74) *Attorney, Agent, or Firm* — Taft Stettinius & Hollister LLP; Stephen F. Rost (57) ABSTRACT

A steerable knuckle, and an axle and track drive assembly including the knuckle, is disclosed. A driveshaft rotatable about a rotational axis extends through the knuckle. The knuckle pivots about a steering axis generally perpendicular to the rotational axis. The driveshaft extends through an axle housing, and a hub is coupled to the driveshaft. The track drive includes a drive wheel, a drive frame, rollers, and a track. Rotation of the driveshaft about the rotational axis rotates the hub and drive wheel which rotates the track about the drive wheel and rollers. Rotation of the knuckle about the steering axis turns the track drive. The knuckle can include a hollow spindle, one or more undercarriage support arm(s) for connecting the track drive frame, steering stops, and king pin, steering cylinder, and tie rod connections. The knuckle can be a single integrated piece.

19 Claims, 7 Drawing Sheets

(56) References Cited

U.S. PATENT DOCUMENTS

| | | | |
|---|---|---|---|
| 2001/0025732 A1 | 10/2001 | Lykken et al. | |
| 2007/0063472 A1* | 3/2007 | Hsieh | B62D 7/18 |
| | | | 280/93.512 |
| 2010/0139994 A1 | 6/2010 | Hansen | |
| 2013/0161918 A1* | 6/2013 | Pare | B62D 55/04 |
| | | | 280/93.512 |
| 2014/0069730 A1 | 3/2014 | Lafreniere et al. | |
| 2014/0125118 A1* | 5/2014 | Nagorcka | B62D 55/14 |
| | | | 305/125 |
| 2015/0197279 A1 | 7/2015 | Pare et al. | |
| 2015/0321709 A1* | 11/2015 | Sewell | B62D 55/12 |
| | | | 180/9.46 |
| 2016/0159414 A1* | 6/2016 | Hansen | B62D 55/04 |
| | | | 305/185 |
| 2018/0118262 A1* | 5/2018 | Vik | B62D 11/20 |
| 2019/0126980 A1* | 5/2019 | Johnson | B62D 11/20 |

OTHER PUBLICATIONS

German Search Report issued in counterpart application No. 102018218680.4 dated Sep. 13, 2019. (14 pages).

\* cited by examiner

STEERABLE KNUCKLE

FIELD OF THE DISCLOSURE

The present disclosure relates to machinery with a track drive, and more particularly to a steerable knuckle on a powered axle for use with tracks.

BACKGROUND

To improve the performance of various types of machinery, for example tractors, they can be provided with front wheel drive. While the front wheels and tires are typically smaller than the rear, by driving both the front and rear wheels, tractive efficiency is improved. A mechanical front wheel drive requires a front drive axle with more components compared to a front axle without mechanical front wheel drive. Efforts to further improve tractive efficiency have also included axles with dual wheels on each side as well as axles with tracks on each side.

Many different steerable knuckle designs have been used on machinery with wheel drives and track drives. For wheel drives, the spindle on the knuckle supports the weight of the vehicle through the wheel and allows rotation of the wheel. Going from wheel drive to track drive on a steerable axle can be a challenge. With tracks, the drive wheel is separate from the track undercarriage. The track undercarriage supports the weight of the vehicle, and the drive wheel propels the track and the vehicle. The challenge can be getting the structural support from the undercarriage of the vehicle through the steerable knuckle. One solution has been to use an external bearing support that connects the drive wheel to the undercarriage and to support the weight of the vehicle through the external bearing support. However, that solution requires an extra bearing support and extra hardware to mate the external bearing support to the axle of the vehicle and may require external oscillation stops to prevent the track undercarriage from pivoting too far forward or backward while traveling over rough terrain.

It may be desirable to have a one-piece integrated knuckle solution that includes a spindle for power transmission to a drive wheel of a track drive and also has structural support to the undercarriage of the vehicle. It may also be desirable to incorporate features on the knuckle that enable the track system to utilize the same axle/knuckle configuration for multiple tread settings.

SUMMARY

A steerable knuckle, as well as an axle and track drive assembly that includes a steerable knuckle, is disclosed for a vehicle that is powered and steerable. The axle assembly includes the steerable knuckle, a driveshaft, a structural axle housing, and a hub. The driveshaft is rotatable in the forward and reverse directions about a rotational axis. The steerable knuckle is pivotable about a steering axis that is generally perpendicular to the rotational axis, and the driveshaft extends through the knuckle. The structural axle housing is coupled to the knuckle and the driveshaft extends through the axle housing. The hub is mechanically coupled to the driveshaft. The track drive assembly includes a drive wheel coupled to the hub, a track drive frame coupled to the steerable knuckle, a plurality of rollers coupled to the drive frame, and a track connected to the drive wheel and the plurality of rollers. Rotation of the driveshaft of the axle about the rotational axis rotates the hub and drive wheel which rotates the track about the drive wheel and the plurality of rollers. Rotation of the steerable knuckle about the steering axis turns the track drive assembly.

The steerable knuckle can include a hollow spindle, where the driveshaft extends through the hollow spindle. The steerable knuckle can include one or more undercarriage support arm(s), where the track drive frame is connected to the one or more undercarriage support arm(s). The one or more undercarriage support arm(s) can have a plurality of mounting holes that provide a plurality of mounting locations for connection of the track drive frame to the undercarriage support arm(s). The steerable knuckle can include a king pin connection, where the knuckle is coupled to the axle housing at the king pin connection and the steering axis passes through the knuckle at the king pin connection. The kingpin connection can include an upper king pin connection and a lower king pin connection, where the steering axis passes through the upper and lower king pin connections. The steerable knuckle can include a steering cylinder connection, where a steering cylinder connected at the steering cylinder connection can be used to pivot the knuckle about the steering axis. The steerable knuckle can include a tie rod connection for connection of a tie rod of the vehicle, where the tie rod can control the orientation of corresponding left and right knuckles on opposite sides of the axle assembly, so that they steer in the same general direction. The steerable knuckle can include a steering stop, where the steering stop limits how far the knuckle can pivot about the steering axis. The steerable knuckle can be a single integrated piece that includes the hollow spindle, the undercarriage support arm(s), the king pin connection, the steering cylinder connection, the tie rod connection and the steering stop.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
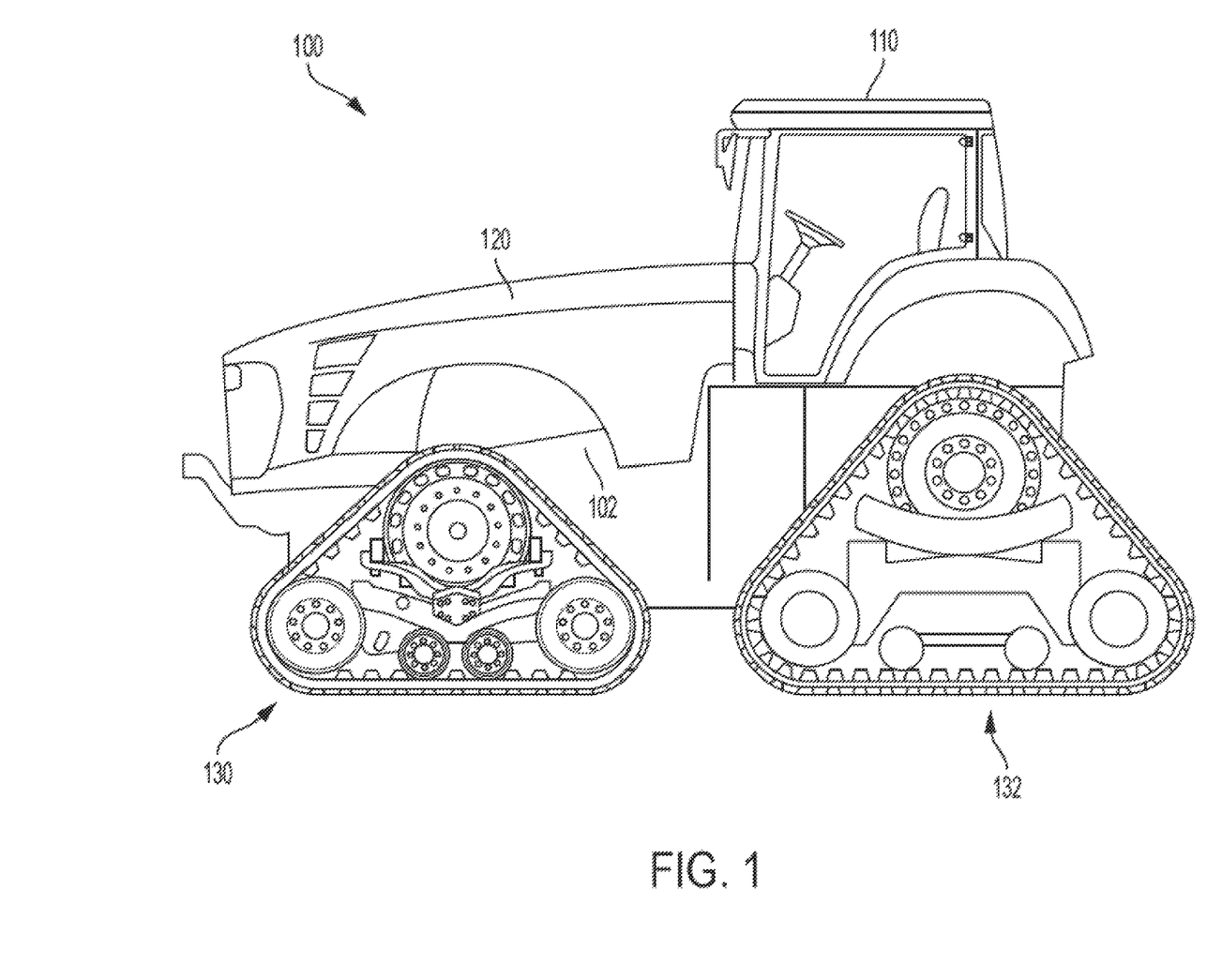
FIG. 1 illustrates an exemplary vehicle with track drives.

FIG. 1 illustrates an exemplary track drive vehicle 100, in this example a tractor, including a tractor frame 102, an operator cab 110, an engine compartment that holds an engine 120, front track drive assemblies 130 and rear track drive assemblies 132. FIG. 1 only shows the left side of the vehicle 100 with one front track drive assembly 130 and one rear track drive assembly 132; the right side of the vehicle 100 also includes one front track drive assembly 130 and one rear track drive assembly 132. The tractor frame 102 supports the operator cab 110 and engine 120. The front and rear track drive assemblies 130, 132 support the tractor frame 102 above the ground, and provide propelling force to the vehicle 100. At least the front track drive assemblies 130 can be steerable to steer the vehicle 100, and alternatively both the front and rear track drive assemblies 130, 132 can be steerable to steer the vehicle 100. The operator cab 110 provides the operator with a clear view of the area being worked by the vehicle 100. The operator cab 110 includes controls for the operator to control the engine 120 and the track drive assemblies 130, 132.

Figure 2:
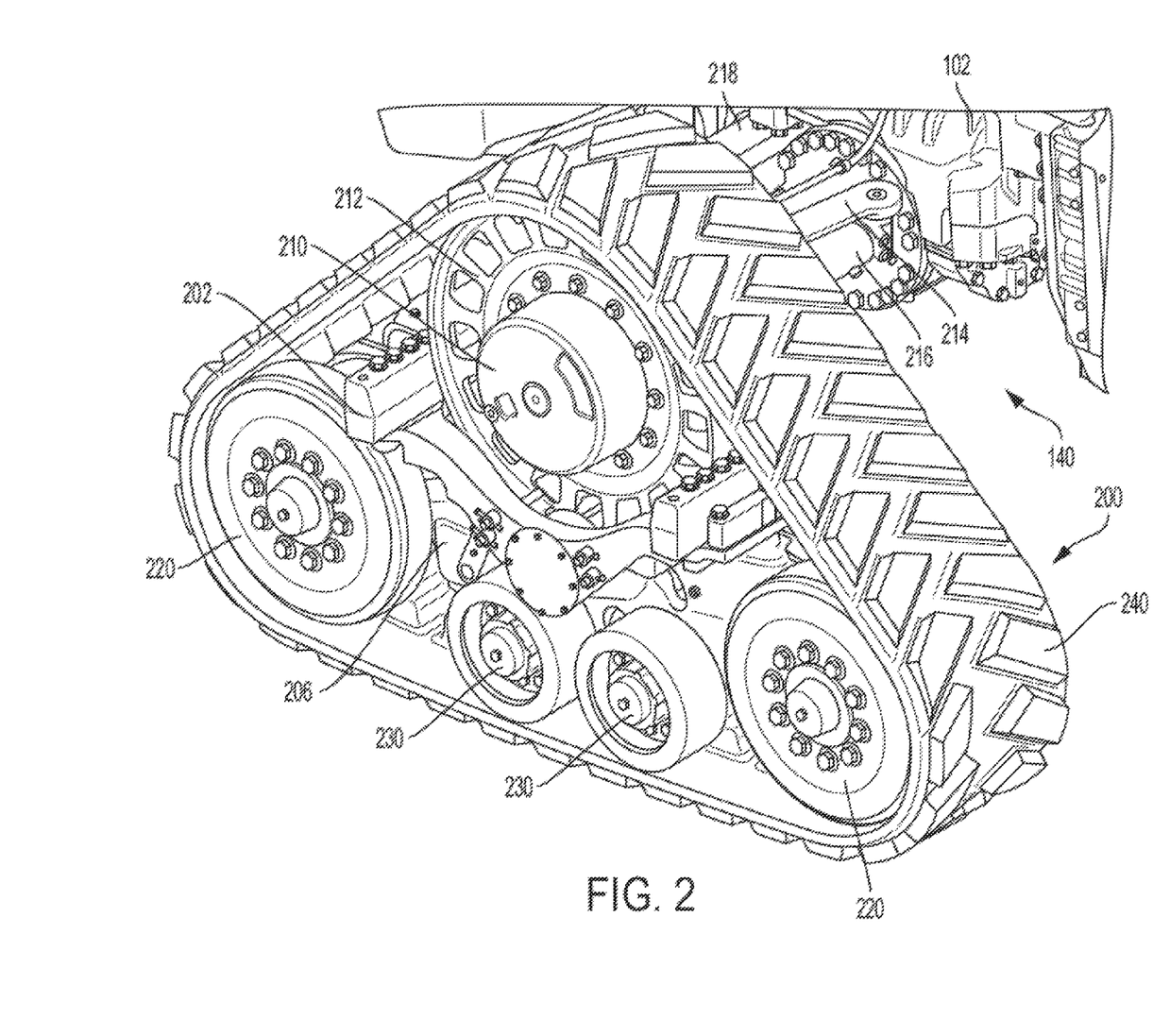
FIG. 2 illustrates an outside view of an exemplary track drive assembly attached to an axle assembly.
Figure 3:
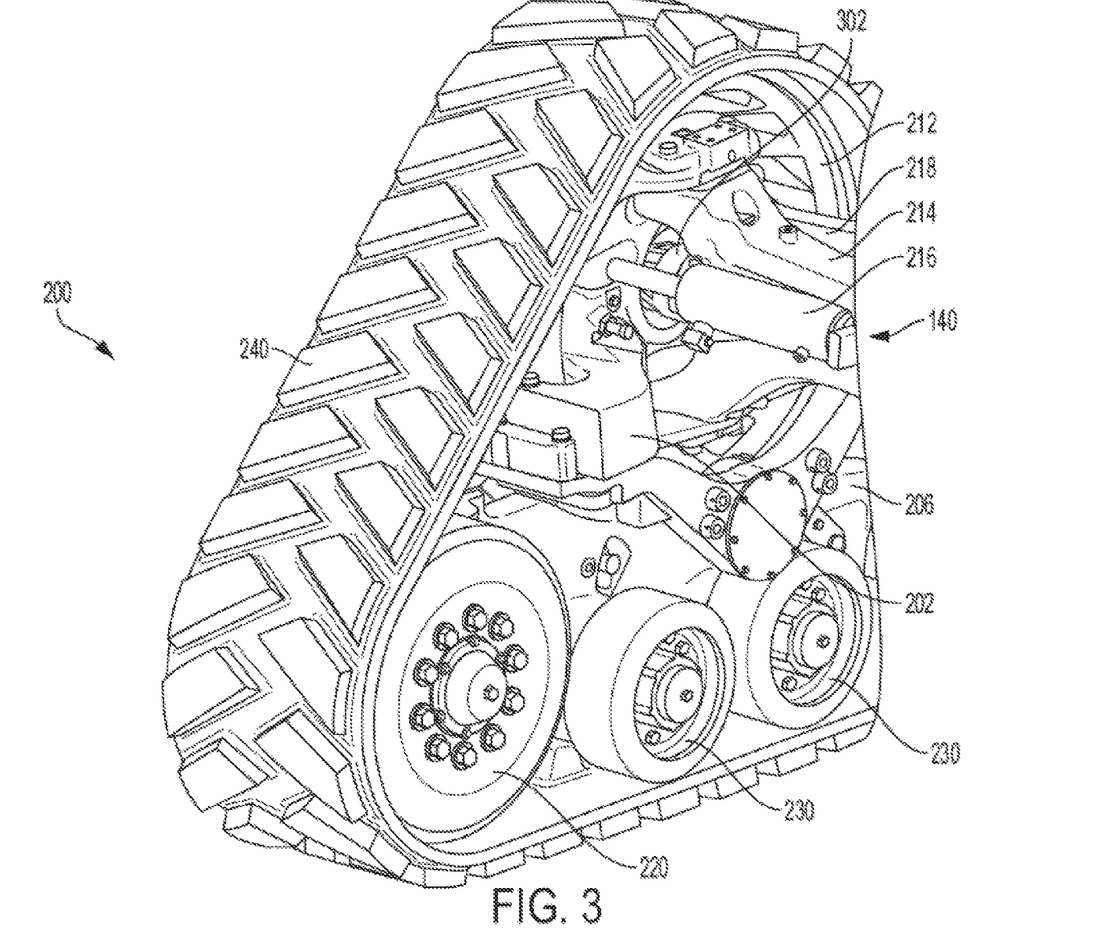
FIG. 3 illustrates an inside view of the exemplary track drive assembly attached to the axle assembly.

FIG. 2 illustrates an outside view and FIG. 3 illustrates an inside view of an exemplary steerable axle assembly 140 used with an exemplary track drive assembly 200. The track drive assembly 200 includes a drive frame 206, a drive wheel 212, idlers 220, mid rollers 230, and track 240. The axle assembly 140 includes a knuckle 202, a hub 210, a driveshaft 302, a structural housing 214, a steering cylinder 216 and a tie rod 218. The axle assembly 140 of the vehicle 100 is driven by power from the engine 120.

Power is transferred to the hub 210 from the driveshaft 302 which extends through the knuckle 202 and the structural housing 214 to power the axle assembly 140. The hub 210 can be mechanically coupled to the driveshaft 302 using a gear set and can be mechanically coupled to the knuckle 202 using a bearing set. The steering cylinder 216 is coupled to the knuckle 202 and the structural axle housing 214. The steering cylinder can rotate the knuckle 202 about a steering axis to control the orientation of the knuckle 202 and hub 210 to the tractor frame 102 to steer the vehicle 100 left or right. The drive frame 206 is connected to the knuckle 202, and will steer in the direction that the knuckle 202 is oriented. The idlers 220 and mid rollers 230 are connected to the drive frame 206. The track 240 moves about the drive wheel 212, idlers 220 and mid rollers 230. The knuckle 202 and drive frame 206 support the components of the track drive assembly 200. The drive wheel 212 is coupled to the hub 210, rotates with the hub 210 and will be oriented in the same direction as the hub 210. The drive wheel 212 drives the track 240 clockwise or counterclockwise around the drive wheel 210, idlers 220 and mid rollers 230 to propel the vehicle 100.

Figure 4:
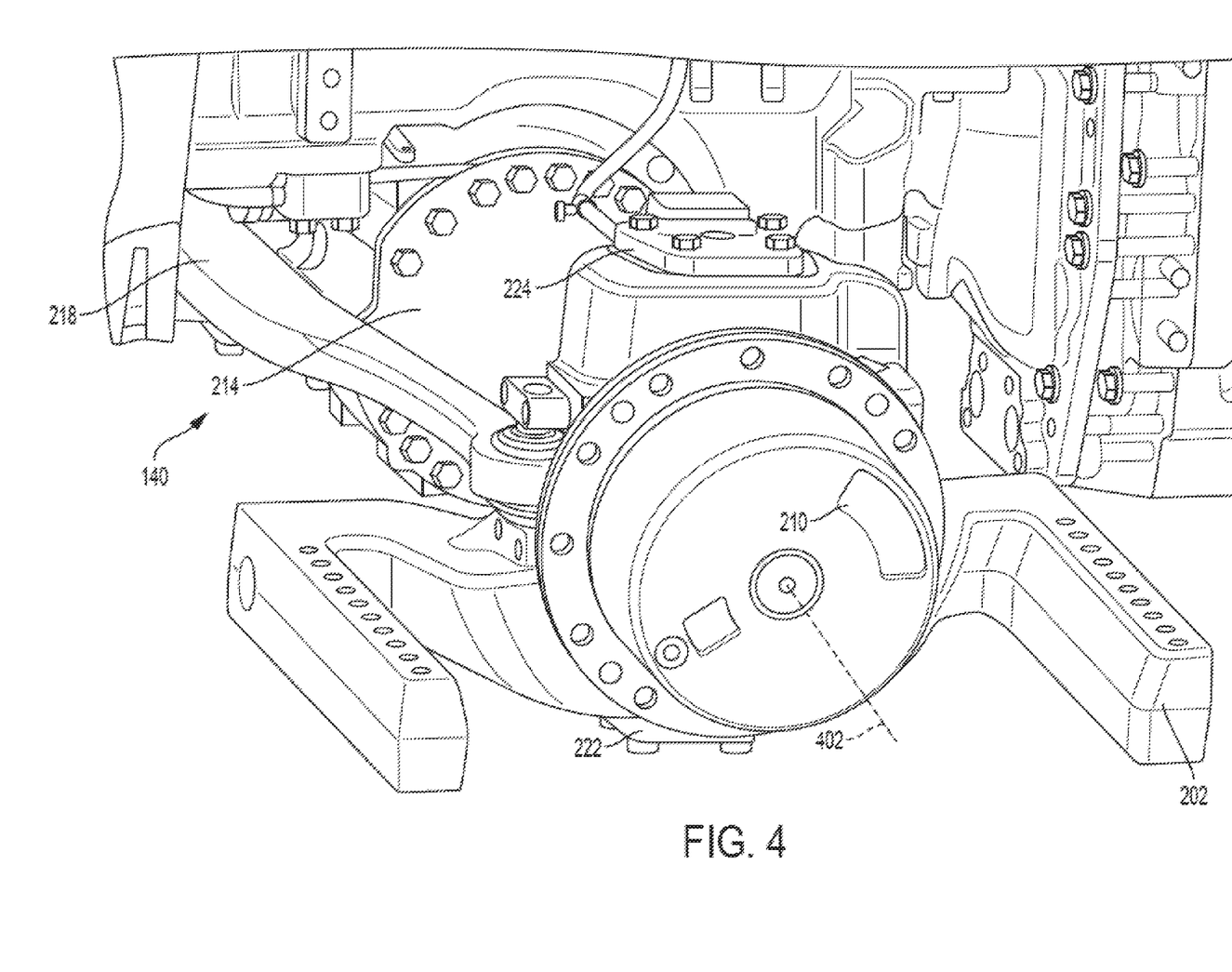
FIG. 4 illustrates an outside view of an exemplary axle assembly without a track assembly.
Figure 5:
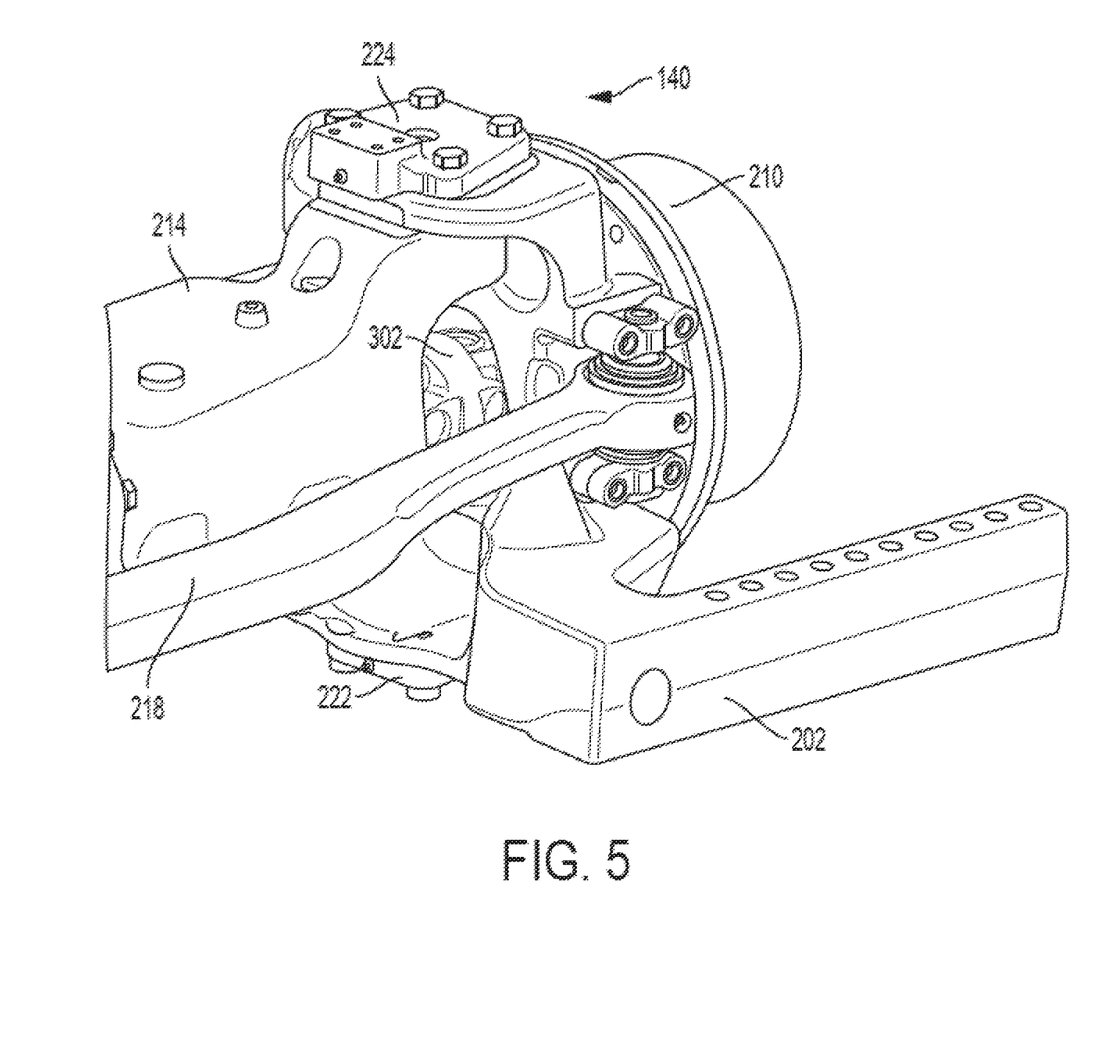
FIG. 5 illustrates an inside view of the exemplary axle assembly without the track assembly.

FIG. 4 illustrates an outside view and FIG. 5 illustrates an inside view of an exemplary axle assembly 140 without a track assembly. FIGS. 4 and 5 show the knuckle 202, the hub 210, the structural housing 214, an upper king pin 224, a lower king pin 222, a tie rod 218, the driveshaft 302 and a rotational axis 402 about which the driveshaft 302 rotates.

Figure 6:
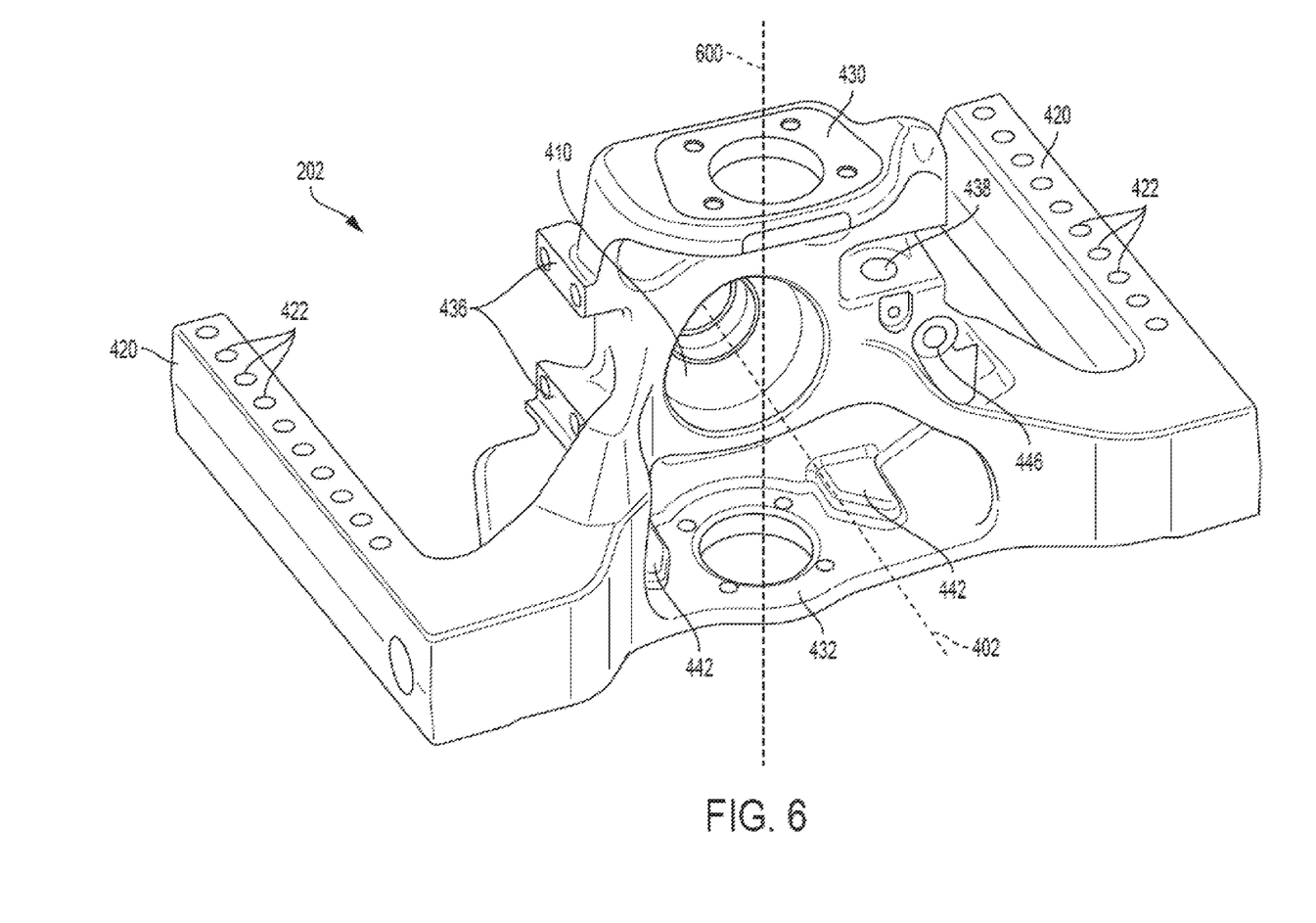
FIG. 6 illustrates an inside view of an exemplary embodiment of a steerable knuckle.
Figure 7:
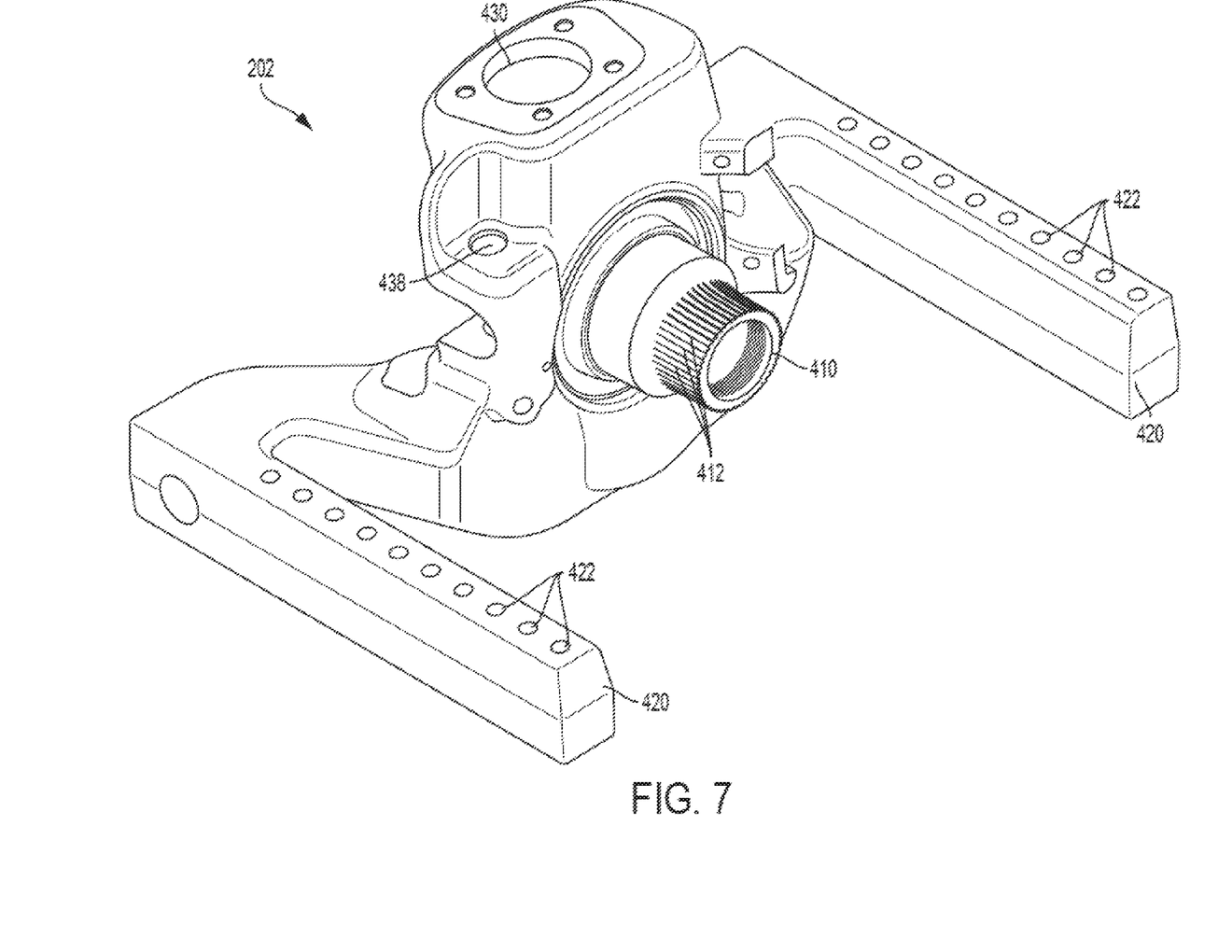
FIG. 7 illustrates an outside view of the exemplary embodiment of the steerable knuckle.

FIG. 6 illustrates an inside view and FIG. 7 illustrates an outside view of an exemplary embodiment of the knuckle 202. The exemplary knuckle 202 is a single piece integrated knuckle that can be used on a powered steerable axle for use with tracks. The knuckle 202 includes a hollow spindle 410, integrated undercarriage support arms 420, an upper king pin connection 430, a lower king pin connection 432, tie rod connection 436, and steering cylinder connection 438. The knuckle 202 can also include adjustable steering stops 446 and/or non-adjustable steering stops 442, and the spindle 410 can include axially extending splines 412 on its outer surface.

The driveshaft 302 passes through the hollow spindle 410 and is coupled to the hub 210 and drive wheel 212. Rotation of the driveshaft 302 about the rotational axis 402 provides rotational power to the wheel hub 210 and drive wheel 212 to drive the track 240 and vehicle 100 forward and backward. The spindle 410 provides support to wheel hub bearings, a final drive gear set and the wheel hub 210, on which the track drive wheel 212 is mounted. The track tension applied to the drive wheel 212 is reacted through the spindle 410. The hub 210 to drive wheel 212 connection can include drive wheel spacers for different tread settings.

The knuckle 202 can pivot about a steering axis 600 that passes through the upper king pin connection 430 and the lower king pin connection 432. The steering axis 600 that passes through the upper and lower king pin connections 430, 432 can include some offsets that may cause the steering axis 600 to range up to 9 degrees from perpendicular with the rotational axis 402, which will be referred to as generally perpendicular. A steering cylinder 216 connected to the knuckle 202 at the steering cylinder connection 438 can control the pivoting of the knuckle 202 about the steering axis 600. A tie rod 218 connected to the knuckle 202 at the tie rod connection 436 can control the orientation of the corresponding left and right knuckles 202 on opposite sides of the axle assembly, so that they steer in the same general direction. The left and right knuckles 202 being on opposite sides of the vehicle 100, for example the left and right knuckles connected to opposite ends of a front axle assembly or a rear axle assembly of the vehicle 100. The steering stops 442, 446 can define limits for pivoting of the knuckle 202 about the steering axis 600. This pivoting of the knuckle 202 about the steering axis 600 enables steering of the track assemblies 200 to steer the vehicle 100 to the left or right.

The integrated undercarriage support arms 420 can include multiple mounting holes 422 that are spaced to provide multiple track mounting location options for incremental tread setting adjustment. The track tension as well as undercarriage vertical, fore/aft and lateral loads are reacted through the support arms 420. The mounting holes 422 of the integrated undercarriage support arms 420 can be evenly spaced or spaced as desired to provide multiple track mounting location options to accommodate different tread settings or tread widths. For example, the track frame 206 can be mounted to inner or outer mounting holes 422 of the support arms 420 to space the track assembly 200 at the desired tread setting.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. An axle and track drive assembly for a vehicle that is powered and steerable; the axle and track drive assembly comprising:
    a driveshaft that is rotatable in forward and reverse directions about a rotational axis;
    a steerable knuckle that is pivotable about a steering axis that is generally perpendicular to the rotational axis, where the driveshaft extends through the knuckle;
    a structural axle housing coupled to the knuckle and the driveshaft extends through the axle housing;
    a hub mechanically coupled to the driveshaft;
    a drive wheel coupled to the hub;
    a track drive frame coupled to the steerable knuckle;
    a plurality of rollers coupled to the drive frame;
    a track connected to the drive wheel and the plurality of rollers;
    wherein rotation of the driveshaft of the axle about the rotational axis rotates the hub and drive wheel which rotates the track about the drive wheel and the plurality of rollers; and
    wherein the steerable knuckle includes an undercarriage support arm and the undercarriage support arm includes a plurality of mounting holes spaced to provide a plurality of mounting locations for connection of the track drive frame to the undercarriage support arm of the steerable knuckle to accommodate a plurality of tread settings.

2. The axle and track drive assembly of claim 1, wherein the steerable knuckle includes a hollow spindle, and the driveshaft extends through the hollow spindle.

3. The axle and track drive assembly of claim 1, wherein the plurality of mounting locations for connection of the track drive frame to the undercarriage support arm of the steerable knuckle include inner mounting holes of the plurality of mounting holes to provide an inner mounting location of the plurality of mounting locations for connection of the track drive frame to the undercarriage support arm to accommodate an inner tread setting, and outer mounting holes of the plurality of mounting holes to provide an outer mounting location of the plurality of mounting locations for connection of the track drive frame to the undercarriage support arm to accommodate an outer tread setting.

4. The axle and track drive assembly of claim 1, wherein the steerable knuckle includes a king pin connection, the knuckle is coupled to the axle housing at the king pin connection and the steering axis passes through the knuckle at the king pin connection.

5. The axle and track drive assembly of claim 4, wherein the steerable knuckle includes a steering cylinder connection, wherein a steering cylinder connected at the steering cylinder connection can be used to pivot the knuckle about the steering axis.

6. The axle and track drive assembly of claim 5, wherein the steerable knuckle includes a tie rod connection for connection of a tie rod of the vehicle.

7. The axle and track drive assembly of claim 5, wherein the steerable knuckle further includes a steering stop, wherein the steering stop limits how far the knuckle can pivot about the steering axis.

8. The axle and track drive assembly of claim 1, wherein the steerable knuckle is a single integrated piece comprising a hollow spindle, first and second undercarriage support arms, a king pin connection, a steering cylinder connection, a tie rod connection and a steering stop; wherein the driveshaft extends through the hollow spindle, the track drive frame is connected to the first and second undercarriage support arms, the steering axis passes through the knuckle at the king pin connection, the steering stop limits how far the knuckle can pivot about the steering axis, and a steering cylinder connected at the steering cylinder connection can pivot the knuckle about the steering axis.

9. A steerable knuckle for an axle assembly of a vehicle that is powered and steerable to be used with a track drive assembly; the steerable knuckle comprising:
    a hollow spindle where a driveshaft of the vehicle extends through the hollow spindle, the driveshaft is rotatable in forward and reverse directions about a rotational axis;
    a first undercarriage support arm that includes a plurality of mounting holes, where the track drive assembly is connected to the first undercarriage support arm and the plurality of mounting holes provide a plurality of mounting locations for connection of the track drive assembly to the first undercarriage support arm to accommodate a plurality of tread settings; and
    a steering axis that passes through the knuckle and is generally perpendicular to the rotational axis, where the steerable knuckle is pivotable about the steering axis;
    wherein rotation of the driveshaft of the vehicle about the rotational axis rotates a track of the track drive assembly, and rotation of the steerable knuckle about the steering axis turns the track drive assembly.

10. The steerable knuckle of claim 9, further comprising a king pin connection, and the steering axis passes through the knuckle at the king pin connection.

11. The steerable knuckle of claim 10, wherein the kingpin connection comprises:
    an upper king pin connection; and
    a lower king pin connection;
    wherein the steering axis passes through the upper and lower king pin connections.

12. The steerable knuckle of claim 10, further comprising a steering cylinder connection, wherein a steering cylinder connected at the steering cylinder connection can be used to pivot the knuckle about the steering axis.

13. The steerable knuckle of claim 12, further comprising a tie rod connection for connection of a tie rod of the vehicle.

14. The steerable knuckle of claim 13, further comprising a steering stop, wherein the steering stop limits how far the steerable knuckle can pivot about the steering axis.

15. The steerable knuckle of claim 9, further comprising a second undercarriage support arm where the track drive assembly is connected to the first and second undercarriage support arms.

16. The steerable knuckle of claim 15, wherein the second undercarriage support arm includes a plurality of mounting holes, and the plurality of mounting holes of the first and second undercarriage support arms provide a plurality of mounting locations for connection of the track drive assembly to the steerable knuckle to accommodate a plurality of tread settings, inner mounting holes of the plurality of mounting holes provide an inner mounting location of the plurality of mounting locations for connection of the track drive assembly to the first and second undercarriage support arms to accommodate an inner tread setting, and outer mounting holes of the plurality of mounting holes provide an outer mounting location of the plurality of mounting locations for connection of the track drive assembly to the first and second undercarriage support arms to accommodate an outer tread setting.

17. The steerable knuckle of claim 15, further comprising a king pin connection, and the steering axis passes through the knuckle at the king pin connection.

18. The steerable knuckle of claim 17, further comprising a steering cylinder connection, wherein a steering cylinder connected at the steering cylinder connection can be used to pivot the knuckle about the steering axis.

19. The steerable knuckle of claim 15, wherein the steerable knuckle is a single integrated piece comprising the hollow spindle, the first and second undercarriage support arms, a king pin connection, a steering cylinder connection, a tie rod connection, and a steering stop;
   wherein the driveshaft extends through the hollow spindle, the track drive assembly is connected to the first and second undercarriage support arms, the steering axis passes through the knuckle at the king pin connection, the steering stop limits how far the knuckle can pivot about the steering axis, and a steering cylinder connected at the steering cylinder connection can pivot the knuckle about the steering axis.

\* \* \* \* \*